United States Patent [19]
Tang et al.

[11] Patent Number: 5,239,309
[45] Date of Patent: Aug. 24, 1993

[54] ULTRA WIDEBAND RADAR EMPLOYING SYNTHESIZED SHORT PULSES

[75] Inventors: Raymond Tang, Fullerton; James G. Small, Westlake Village, both of Calif.

[73] Assignee: Hughes Aircraft Company, Los Angeles, Calif.

[21] Appl. No.: 722,769

[22] Filed: Jun. 27, 1991

[51] Int. Cl.$^5$ ............................................. G01S 7/28
[52] U.S. Cl. ........................................ 342/13; 342/60; 342/201; 455/103
[58] Field of Search ............... 342/13, 60, 201, 202; 455/103

[56] References Cited

U.S. PATENT DOCUMENTS

| | | |
|---|---|---|
| 3,500,404 | 3/1970 | Anderson et al. |
| 3,719,945 | 3/1973 | Sletten et al. ............ 342/201 X |
| 3,745,578 | 7/1973 | Barrett, Jr. et al. ............ 342/201 |
| 3,896,434 | 7/1975 | Sirven . |
| 3,945,012 | 3/1976 | Cooper ............ 342/201 X |
| 4,041,489 | 8/1977 | Lewis ............ 342/201 |
| 4,218,678 | 8/1980 | Fowler et al. |
| 4,443,799 | 4/1984 | Rubin ............ 342/201 |
| 5,146,616 | 9/1992 | Tang et al. ............ 342/201 X |

*Primary Examiner*—T. H. Tubbesing
*Attorney, Agent, or Firm*—Wanda K. Denson-Low

[57] ABSTRACT

An impulse radar that forms a predetermined radar pulse train in space by transmitting individual spectral components thereof. Thus, a train of extremely short pulses is obtained without switching a radio frequency signal on and off at a high rate. An oscillator is coupled to a harmonic generator, and a power divider distributes the output of the harmonic generator to a multiplicity of amplifiers. Each amplifier has a phase-locked VCO circuit that provides frequency accuracy, spectral purity, low noise and frequency stability. Thus, each amplifier provides one of the spectral components of the predetermined radar pulse train. The amplifiers are coupled to a multiplexing feed that illuminates a reflector. On receive, the multiplexing feed separates the spectral components of the incoming pulse train. Each spectral component is coupled to its own narrow band receiver, and one receiver is used to amplify and detect each spectral component. The signals from the receivers are coherently combined in a signal processor in which the signals add coherently and the noise signals do not. The output of the signal processor may be applied to a radar display. The short pulses produced by the radar provide very high resolution, and can map a target by sweeping across it, thus imaging it. The radar emits a wideband signal at a low power level; the signal is difficult to detect and intercept, and thus provides for a low probability of intercept radar. The radar may be used as a microwave link, wherein the oscillator may be frequency modulated to provide communications. It may also be used as a covert IFF system to identify friendly aircraft. The radar provides signals that penetrate sand and may be used for mapping and to locate land mines buried in the sand. It may also be used for clearing away land mines by detonating them. When the power is turned up, the radar provides for a directed energy beam. The radar may perform adaptive jamming, and is also a jam resistant radar. It is hard to jam because the receiver array is insensitive to noise at frequencies outside the narrow bandwidths of the individual receivers and also to noise which is not coherent across the multiplicity of receiver channels.

9 Claims, 9 Drawing Sheets

ULTRA WIDEBAND RADAR EMPLOYING SYNTHESIZED SHORT PULSES

This invention was made with Government support under Contract No. N66001-87-D-0057/0012 awarded by the Department of the Navy. The Government has certain rights in this invention.

BACKGROUND

The present invention relates to radar transmitters and receivers and, more particularly, to the transmission and reception of spectral components of a predetermined train of short pulses.

There exists a need to defend ships against low flying sea skimmer missiles such as those known as Exocet or Silkworm, or the like. Conventional radars have difficulty detecting such missiles because of the images or reflections that cause the signal return from the missile to fade in and out when the direct path and multipath signals reinforce or cancel each other. Conventional radars employ a long pulsewidth and typically have an instantaneous bandwidth on the order of 100 MHz. However, a radar that employs a train of short pulses on the order of 200 picoseconds having an instantaneous bandwidth on the order of 5 GHz is capable of separating the direct path return from the multipath return, thus allowing detection of low flying sea skimmer missiles. Furthermore, the wide bandwidth signal may enhance the signal return from a target having a low radar cross-section because of resonant scattering characteristics of the target over a wide frequency band. Thus, such a short pulse radar may also have potential application as an adjunct radar to existing ship air defense radars.

Impulse radars employing trains of short pulses are currently being investigated in research laboratories. These existing experimental radars typically take the approach of switching the RF transmit signal on and off in picoseconds to generate a train of extremely short pulses. Such radars require the impulse generator to have a peak power on the order of several megawatts due to the fact that it has a low duty factor in that the pulse width of the impulse generator is extremely short compared to the required interpulse period. On receive, an extremely wideband receiver is required to detect the entire bandwidth of the impulse. Hence, it is difficult to provide satisfactory gain in the receiver amplifier. Accordingly, there is a need for an improved impulse radar system.

DESCRIPTION OF THE RELATED ART

U.S. Pat. No. 3,500,404 to J. O. Anderson et al. is for a Radar System having Improved Response to Small Targets. It addresses the problem of enhancing the response of a radar to small targets located in a clutter producing background. The solution proposed is the pulsed transmission of a plurality of discrete carrier frequencies, the frequency difference between successive ones of which is at least that frequency represented by the reciprocal of the system pulsewidth. In one embodiment shown in FIG. 5 of the patent, a plurality of CW magnetrons operating at discrete carrier frequencies have their outputs sequentially multiplexed to an antenna by pulse power modulators 31a–31d operating in conjunction with directional filters 30a–30d. In a second embodiment shown in FIG. 6 of the patent, a single microwave source has its output frequency varied while a pulse power modulator applies pulses at discrete frequencies sequentially to the antenna. It should be noted that the radar of U.S. Pat. No. 3,500,404 transmits the discrete frequency pulses sequentially, rather than simultaneously, that the transmitted pulses are not phase coherent (at least in FIG. 5), that the receiver is not phase coherent, and that the antenna does not radiate or receive all the spectral components of a predetermined pulse train about a common phase center.

U.S. Pat. No. 3,745,578 to Barrett, Jr. et al. represents an improvement over the above invention of Anderson et al., and is assigned to the same assignee. The 578 patent notes that the 404 patent employs separate frequency sources for each of the discrete frequencies making it difficult to mutually phase-synchronize such frequencies at the beginning of each pulse. In other words, the transmitted pulses are not phase coherent. The 578 patent employs a pulsed transmitter comprising closed-loop single sideband modulation means coupled to a source of radio frequency energy and to a source of a modulating or a spacing frequency, thus using a single radio frequency source to provide the transmitted discrete frequencies. However, it should be noted that U.S. Pat. No. 3,745,578 transmits the discrete frequency pulses concomitantly, rather than simultaneously, that the receiver is not phase coherent, and that the antenna does not radiate or receive all the spectral components of a predetermined pulse train about a common phase center. U.S. Pat. No. 3,745,578 does not involve the use of a multiplicity of transmitters and receivers, one for each Fourier spectral component of a predetermined pulse train synthesized in space.

U.S. Pat. No. 3,945,012 to Cooper represents an improvement over both of the above patents, and is assigned to the same assignee. The 012 patent notes that the 578 patent employs a common preselected spacing frequency between adjacent ones of the discrete frequencies, leading to an unduly large system bandwidth, resulting in deterioration in receiver signal to noise ratio. The 012 patent also notes that the 578 patent is subject to adverse peak power to average power ratios, which tend to limit the maximum system range performance due to transmitter saturation. The invention of U.S. Pat. No. 3,945,012 uses an arrangement in which a chirped or frequency modulated pulse is also amplitude modulated. However, the invention of U.S. Pat. No. 3,945,012 does not transmit discrete frequency spectral components simultaneously, does not have a phase coherent receiver, and does not have an antenna that radiates or receives all the spectral components of a predetermined pulse train about a common phase center. U.S. Pat. No. 3,945,012 does not involve the use of a multiplicity of transmitters and receivers, one for each Fourier spectral component of a predetermined pulse train synthesized in space.

U.S. Pat. No. 3,896,434 to J. Sirven is for a radar that transmits a series of pulses of discrete frequencies sequentially by means of a multiplexing arrangement. On reception, the return signals are detected in in-phase and quadrature phase detectors, converted to digital signals, and processed in a digital signal processor. The signals are processed using a Fast Fourier Transform algorithm. It is noted that the radar of U.S. Pat. No. 3,896,434 does not transmit discrete spectral components simultaneously, and that the antenna does not radiate or receive all the spectral components of a predetermined pulse train about a common phase center.

U.S. Pat. No. 3,896,434 does not radiate an ultra wideband signal to synthesize a train of extremely short pulses in space. U.S. Pat. No. 3,896,434 does not involve the use of a multiplicity of transmitters and receivers, one for each Fourier spectral component of a predetermined pulse train synthesized in space.

U.S. Pat. No. 4,218,678 to Fowler et al. is for a pulse radar system employing a synthetic pulse formed from a Fourier spectrum of frequencies generated by digitally controlled transmitter and receiver circuits. However, the individual spectral components are transmitted separately, one after the other, in sequence. On receive, the returned signal is detected in phase and amplitude for both the in-phase component and the quadrature phase component. All of the in-phase and quadrature values for each spectral component of the synthetic pulse are recorded. After the last frequency component has been transmitted, the echo received, and the I and Q values recorded, the time trace of the synthetic pulse is reconstructed using the inverse Fourier transform. Note that the radar of U.S. Pat. No. 4,218,678 does not involve the use of a multiplicity of transmitters and receivers, one for each Fourier spectral component of a predetermined pulse train synthesized in space, that the spectral components are transmitted sequentially rather than simultaneously, and that the antenna does not radiate or receive all the spectral components of a predetermined pulse train about a common phase center.

It is an objective of the present invention to provide an improved radar that is able to detect low flying sea skimmer missiles. Another objective of the invention is the provision of a radar system employing a train of pulses having a duration on the order of 200 picoseconds having an instantaneous bandwidth on the order of 5 GHz. Yet another objective of the present invention is to provide an impulse radar employing a train of extremely short pulses but which does not generate the pulses by switching the radio frequency transmit signal on and off.

SUMMARY OF THE INVENTION

In accordance with these and other objectives and features of the present invention there is provided an impulse radar employing multiple transmitters and receivers, one for each spectral component of a predetermined synthesized pulse train. Each transmitter operates essentially in a CW or continuous wave mode. The spectral components are not transmitted separately, one after the other in sequence. They are all transmitted together. In order to achieve phase coherency in all the transmitters, a master oscillator is coupled to a harmonic generator which provides all the required spectral components to drive a plurality of final amplifiers. The final amplifiers are filter amplifiers employing phase locked voltage controlled oscillators. This arrangement assures the required frequency accuracy, spectral purity, low noise and frequency stability. The signals from the final amplifiers are coupled by a plurality of duplexers to a broadband multiplexing antenna means. The multiplexing antenna means forms a high gain beam. The antenna means has the same phase center for all the spectral components. The radiated spectral components result in synthesis of the predetermined train of short pulses in space. The required number of transmitting sources is a function of the pulse duration and the pulse repetition frequency. The "on" time for each transmitter is made equal to the total length of the synthesized predetermined pulse train corresponding to the required integration time on target. Hence, the modulated output of each transmitter has a sin x/x frequency distribution corresponding to one of the spectral lines of the synthesized predetermined pulse train.

In the receive mode, the broadband multiplexing antenna means separates all the spectral components of the incoming pulse train. The received spectral components are coupled by the plurality of duplexers to a plurality of narrow band receivers where the signal is preamplified to establish the required signal to noise ratio. Each spectral component is amplified and detected in its own individual narrow band receiver. Low noise amplifiers with high gain are used. The amplified signals from the outputs of the receivers are coherently combined in a signal processor to form an output signal that is applied to a radar display.

It should be understood that the detection of very small objects such as missiles is merely one of many possible uses for the impulse radar of the present invention. The short pulses produced by the present invention provide very high resolution. At the speed of light, a 200 picosecond pulse is on the order of two inches long. It can map a target aircraft, for example, section by section by sweeping across the aircraft, starting at the nose, going back to the wings, and then to the tail. Thus, it provides a form of imaging that may be termed non-cooperative target recognition. Furthermore, the system of the present invention is not subject to multipath cancellation problems, since the transmission covers a very wide bandwidth, and hence, not all of the signal components fade out at the same time.

The impulse radar of the present invention emits a wideband signal at a low power level. The signal is difficult to detect and intercept, and thus provides for a low probability of intercept radar. A multiplicity of the receivers are used to detect the multiplicity of transmitted frequencies. The output signals from each receiver are coherently combined by the processor. Since the arriving waves are coherent across the channels while the noise is not, a strong detected signal results.

In each receiver channel, the operational signal-to-noise ratio is generally set substantially below the detection threshold for a single receiver. In effect, this array of coherently combined receivers constitutes a matched filter for the transmitted waveform. Efficient detection of the waveform requires an a priori knowledge of the transmitter architecture. Various waveform parameters, such as frequencies and phases, may be rapidly changed to make unintended detection difficult.

The present invention may also be used for communications as a microwave link. The local oscillator in the transmitter may be frequency modulated to provide communications. It may also be used as a covert IFF system to identify friendly aircraft. The radar of the present invention provides signals that penetrate sand and may be used for mapping and to locate land mind buried in the sand. It may also be used for clearing away land mines by detonating them. When the power is turned up, the radar provides for a directed energy beam. The radar of the present invention may be configured to perform adaptive jamming, and may be caused to sweep or scan. The present invention is also a jam resistant radar. It is hard to jam because the receiver array is insensitive to noise at frequencies outside the narrow bandwidths of the individual receivers and also to noise which is not coherent across the multiplicity of receiver channels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
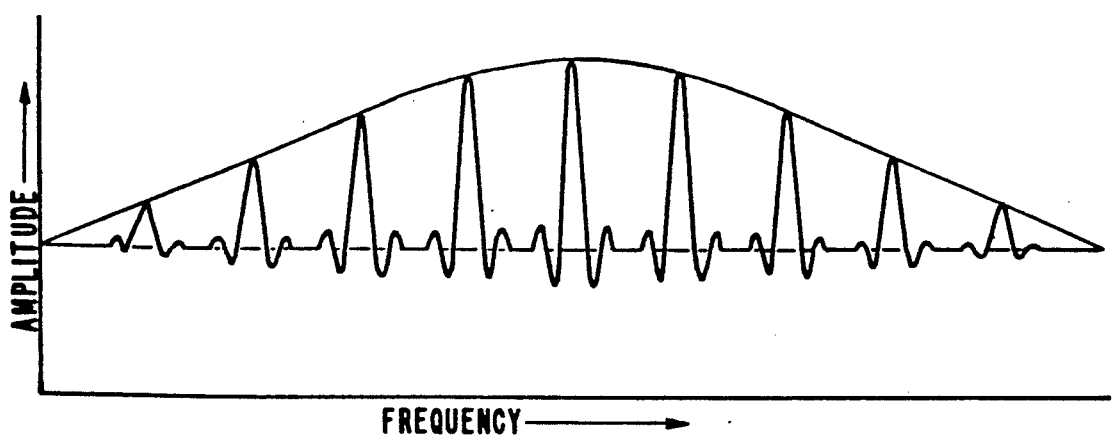
FIG. 1 is a graph of amplitude versus frequency for a plot of the spectrum obtained by evaluating a Fourier series for a train of rectangular pulses.

The spectrum of a coherent pulse train of infinite length consists of spectral lines at intervals equal to the pulse repetition frequency, within an envelope having the same shape as the spectrum of a single pulse. If the coherent pulse train is not infinitely long, the individual spectral lines have a finite width and the same shape as the spectrum of a single pulse the length of the train. Line width is thus inversely proportional to the length of the train. An illustration of the spectral components of a train of rectangular pulses is shown in FIG. 1 which is a graph of amplitude versus frequency as found by use of the Fourier series. FIG. 1 illustrates how the individual spectral components comprise the pulse train in the frequency domain. In accordance with the principles of the present invention, predetermined spectral components are generated and radiated by a common antenna means having the same phase center for all the spectral components. This results in a predetermined transmitted train of short pulses being synthesized in space. The required number of transmitting sources is a function of the pulse duration and the pulse repetition frequency.

Figure 2:
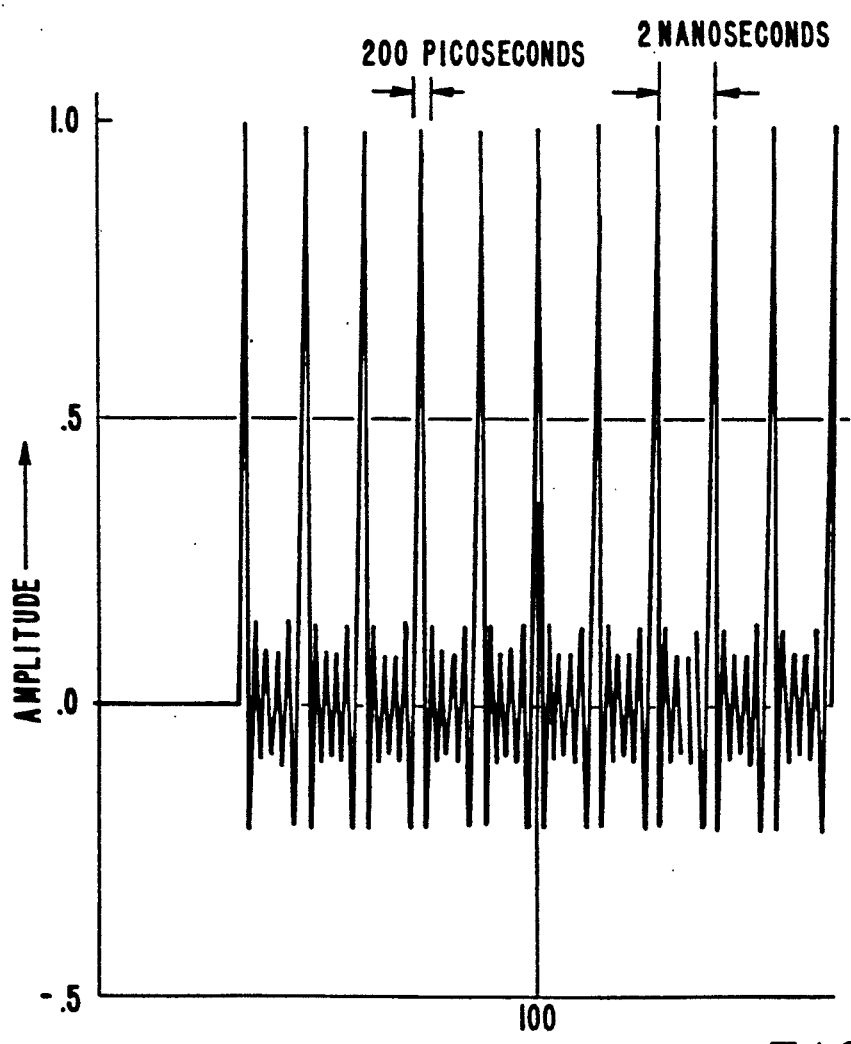
FIG. 2 is a graph of amplitude versus time for a plot of a train of 200 picosecond pulses spaced at 2 nanoseconds apart.
Figure 3:
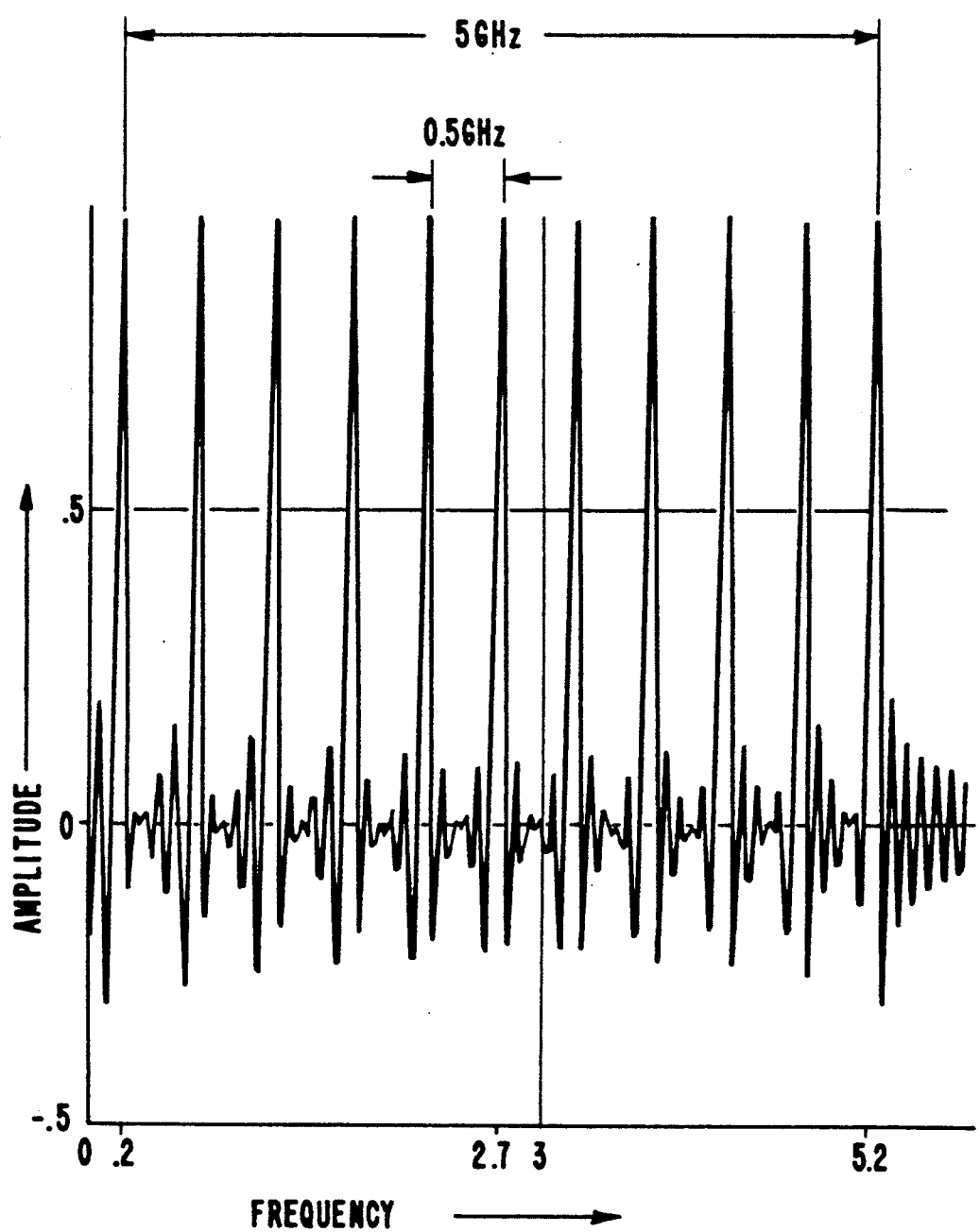
FIG. 3 is a graph of amplitude versus frequency for a plot of spectral components required for generating a train of eleven 200 picosecond pulses over a duration of 20 nanoseconds.

FIG. 2 is a graph of amplitude versus time for a train of 200 picosecond pulses spaced 2 nanoseconds apart. This pulse train is representative of a predetermined desired radar signal to be synthesized in space by an impulse radar system of the present invention. Rather than generating the signal of FIG. 2 in real time by switching a radio frequency transmit signal on and off, the individual spectral components are generated and transmitted instead. FIG. 2 shows that a train of 200 picosecond pulses at a pulse repetition frequency of 0.5 GHz is generated by using eleven transmitting sources over a 5 GHz frequency bandwidth. FIG. 3 is a graph of amplitude versus frequency for a plot of spectral components required for generating a train of eleven 200 picosecond pulses over a duration of 20 nanoseconds. These eleven spectral components have uniform amplitudes and they are spaced 0.5 GHz apart.

Figure 4:
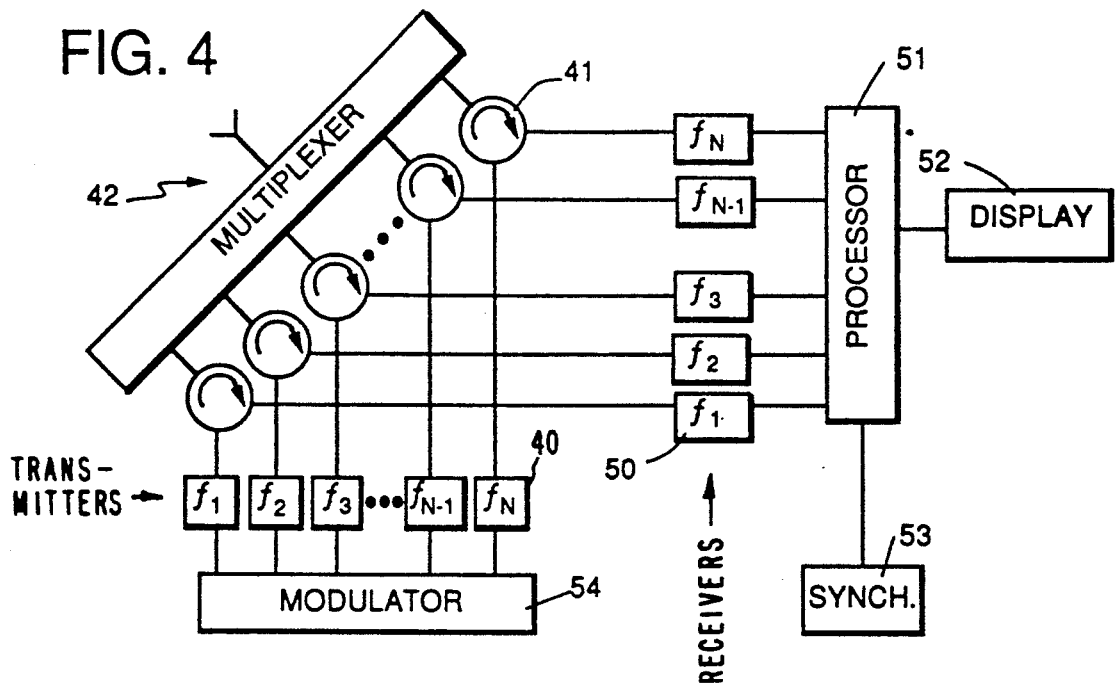
FIG. 4 is a schematic diagram of an embodiment of an impulse radar in accordance with the principles of the present invention.

FIG. 4 is a schematic diagram of an embodiment of an impulse radar in accordance with the principles of the present invention. There is provided a plurality of transmitters 40, one for each spectral component of a predetermined pulse train. The transmitters 40 generate the required power aperture product for a predetermined detection range and signal to noise ratio. Each of the transmitters 40 operates essentially in a CW or continuous wave mode. For a 25 nautical mile detection range and an eight foot antenna aperture, the required power is only about 500 watts. The signals from the transmitters 40 are coupled by a plurality of duplexers 41 to a broadband multiplexing antenna means 42 that forms a high gain beam. The broadband multiplexing antenna means 42 has a common phase center at the center of the aperture for all the spectral components.

The "on" time of each of the transmitters 40 is made equal to the total length of the predetermined synthesized pulse train corresponding to the required integration time on target. Hence, the modulated output of each of the transmitters 40 has a sin x/x frequency distribution corresponding to one of the spectral lines of the predetermined pulse train. Thus, a coherent summation of all the signals from the transmitters 40 is produced in space to form the predetermined train of short pulses. For N transmitters 40, the total radiated average power in the pulse train is N times the average power in one of the transmitters 40. The peak power is $N^2$ times the power of one of the transmitters 40.

On receive, the broadband multiplexing antenna means 42 separates all the spectral components of the incoming pulse train. The spectral components are coupled by the plurality of duplexers 41 to a plurality of narrow band receivers 50 to amplify and detect the signals. Each of the spectral components has its own narrow band receiver 50 where the signal is preamplified to establish the required signal to noise ratio. Since the bandwidth of the spectral components is relatively narrow, low noise amplifiers with high gain are used to maximize the signal to noise ratio. The signals from the outputs of the receivers 50 are coherently combined in a signal processor 51 to form an output signal that is applied to a radar display 52. Since the signals at the outputs of the receivers 50 are coherent whereas noise signals are not, an improvement in signal to noise ratio corresponding to the number of receive channels is achieved. Thus, there is a processing gain in signal to noise ratio corresponding to the total number of receivers 50 used in the system.

Figure 5:
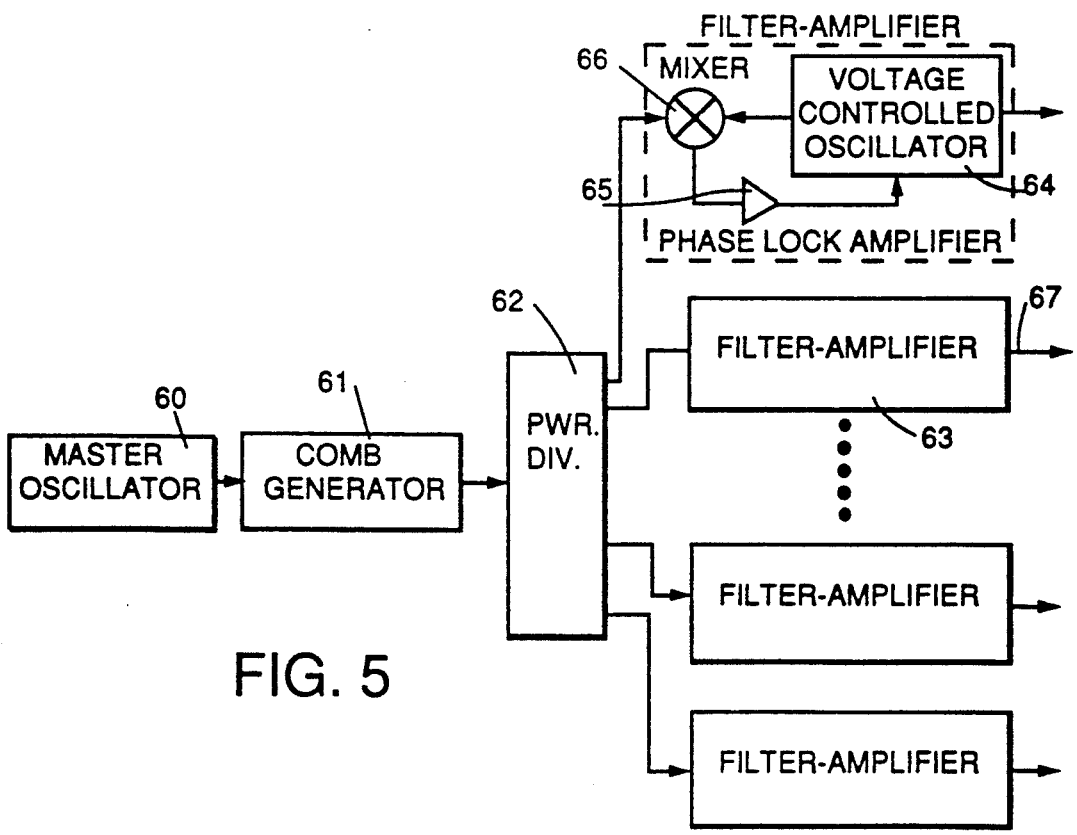
FIG. 5 is a schematic diagram in block form of a phase coherent transmitter chain that may be employed in the impulse radar FIG. 4.

As is conventional in radar systems, the embodiment of an impulse radar illustrated in FIG. 4 also comprises a synchronizer 53 that times the transmission from the transmitters 40, and a modulator 54 that provides pulses of input power to the transmitters 40. FIG. 5 is a schematic diagram in block form of a phase coherent transmitter chain that may be employed in the impulse radar of FIG. 4. In order to achieve phase coherency in all the transmitters 40, a common master oscillator 60 is employed. The master oscillator 60 is coupled to a harmonic generator which may be a comb generator 61, as shown in FIG. 5, although other types of harmonic generators may be used, if desired. The output of the comb generator 61 is a signal which comprises all the predetermined spectral components needed to drive the transmitters 40. The output of the comb generator 61 is applied to a power divider 62 that applies the signal to a plurality of final filter-amplifiers 63. The filter-amplifier 63 comprises a voltage controlled oscillator 64, a phase-lock amplifier 65, and a mixer 66 connected as a phase-locked VCO circuit. The phase-locked VCO circuit provides the required frequency accuracy, spectral purity, low noise and frequency stability. The output of the plurality of filter-amplifiers 63 is applied to the plurality of duplexers 41 by a plurality of output lines 67.

Figure 6:
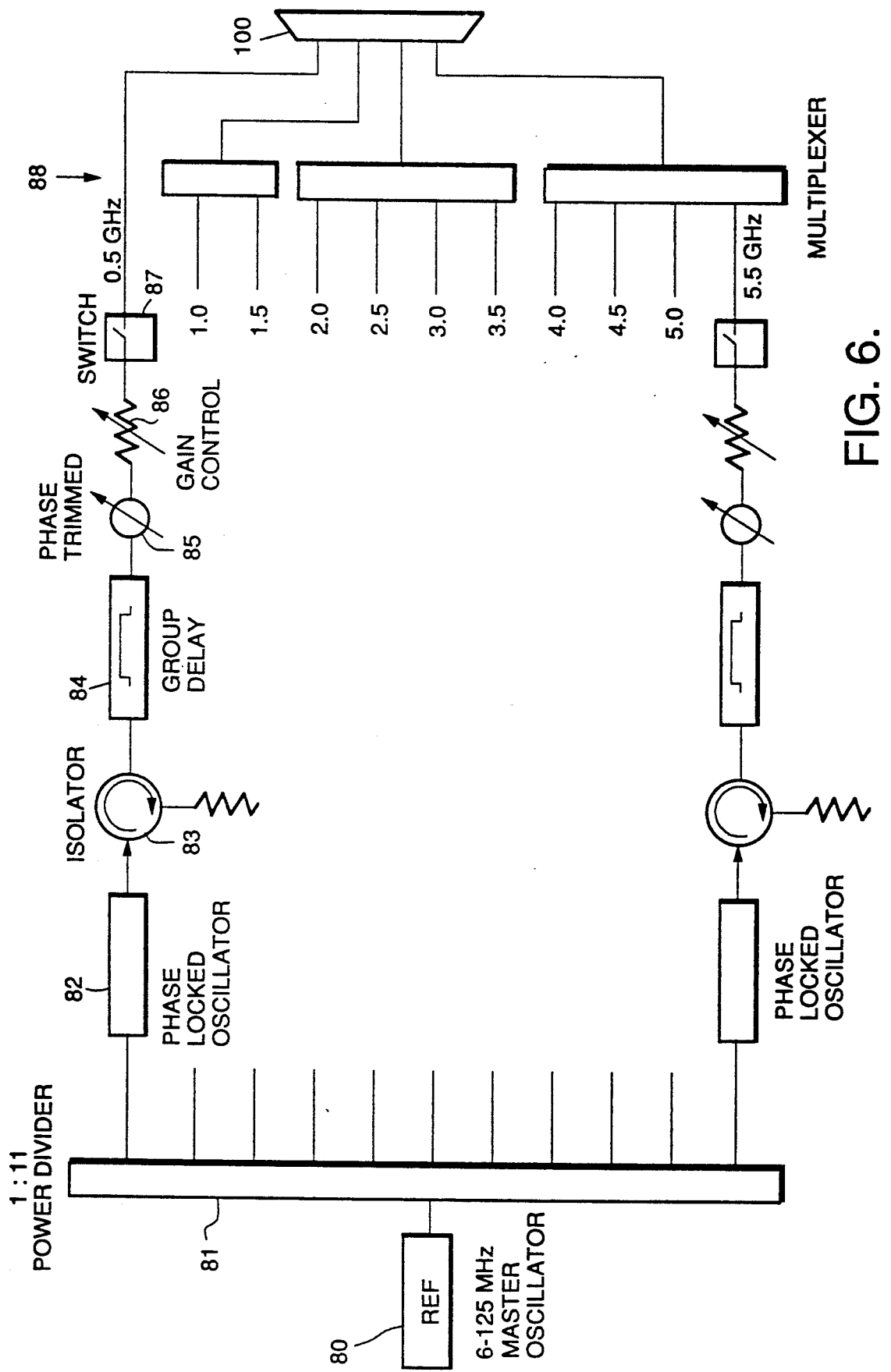
FIG. 6 is a schematic diagram of a different embodiment of a phase coherent transmitter chain showing a plurality of coherent signal sources.

FIG. 6 is a schematic diagram of a slightly different embodiment of a phase coherent transmitter chain of the improved impulse radar of the present invention. The embodiment of FIG. 6 was actually constructed and tested, and illustrates the manner of generation of a plurality of coherent signal sources. A master oscillator 80 provides an input signal to a 1:11 power divider 81. Each output of the power divider 81 is individually coupled to the input of a phase-locked oscillator 82. The output of each phase-locked oscillator 82 is coupled through an isolator 83 to group delay means 84. The output of the group delay means 84 is coupled through a phase trimmer 85 and a gain control 86 to a switch 87. The output of each switch 87 is coupled by way of a multiplexer 88 to broadband antenna means 100. FIG. 6 indicates the development of eleven spectral components extending at intervals of 0.5 GHz from 0.5 GHz to 5.5 GHz from the output of master oscillator 80 operating at 125 MHz.

Figure 7:
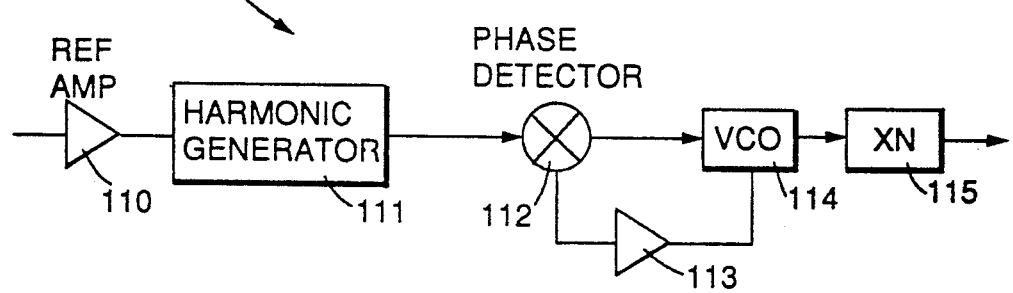
FIG. 7 is a schematic diagram of a phase locked oscillator employed in the phase coherent transmitter chain of FIG. 6.

FIG. 7 is a schematic diagram of the phase-locked oscillator 82 shown in FIG. 6, which may be a phase-locked cavity oscillator. The phase-locked oscillator 82 comprises a reference amplifier 110 which receives its input from the master oscillator 80 by way of the power divider 81, as shown in FIG. 6. The reference amplifier 110 drives a harmonic generator 111, which may be a comb generator, if desired. The output of the harmonic generator 111 is coupled to a phase-locked loop comprising a phase detector 112, a phase-locked amplifier 113, and a voltage controlled oscillator 114. The output of the voltage controlled oscillator 114 is coupled to a frequency multiplier 115 whose output is connected to the isolator 83 shown in FIG. 6.

Figure 8:
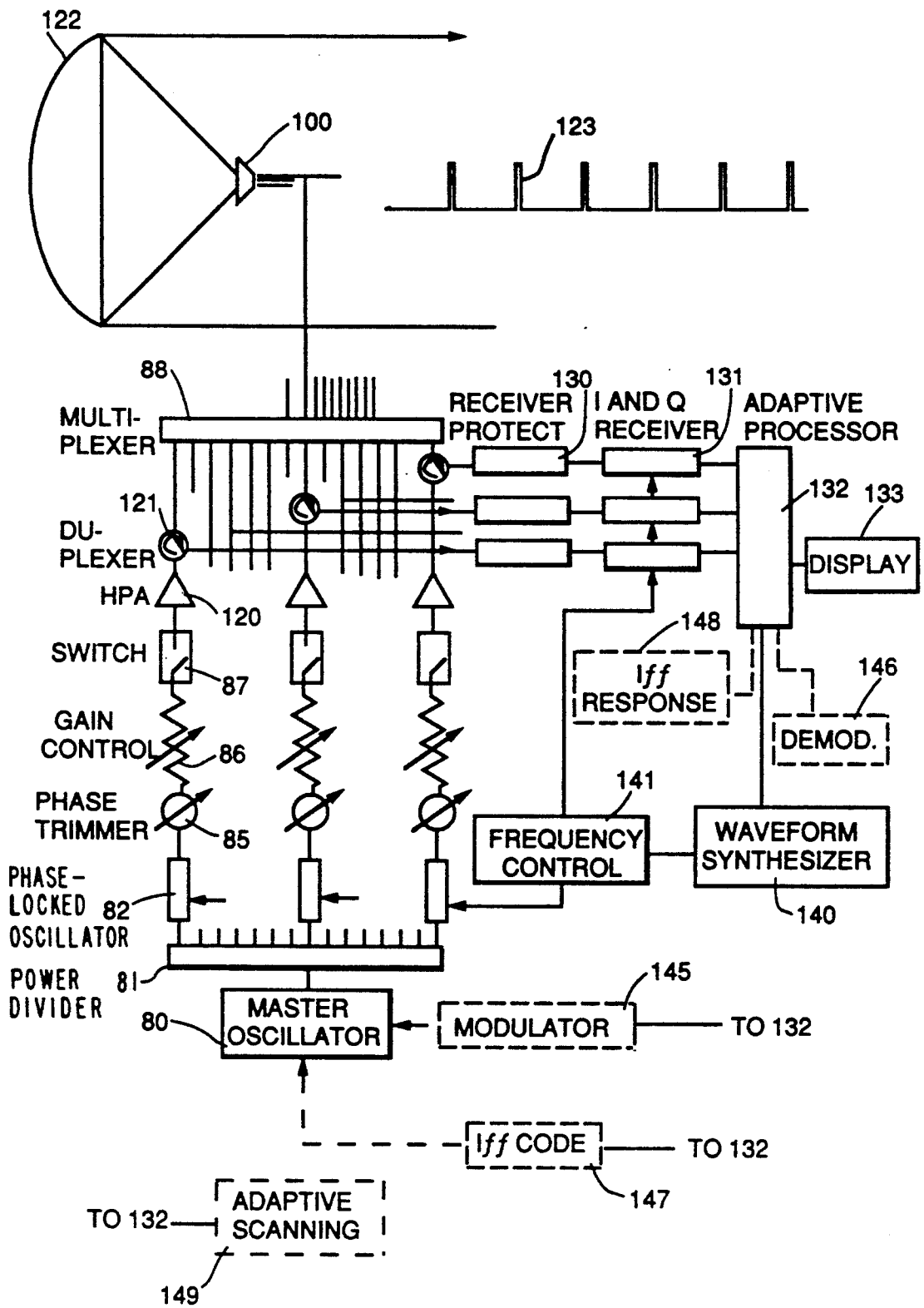
FIG. 8 is a schematic diagram of an embodiment of a complete impulse radar in accordance with the present invention.

FIG. 8 is a schematic diagram of an embodiment of a complete impulse radar, including the receiver portion. Those elements corresponding to elements illustrated in FIG. 6 are identified by the same reference numeral. In FIG. 8, it may be seen that a plurality of transmitting sources derive their individual spectral components from a common master oscillator 80, and therefore are phase coherent. The phase coherent transmitter chain comprises the power divider 81, phase-locked oscillator 82, phase trimmer 85, gain control 86, and switch 87. Each phase coherent source may be switched by its respective switch 87 to the input of a high power amplifier 120. The outputs of all the high power amplifiers 120 are coupled by way of a plurality of duplexers 121 to the multiplexer 88. The broadband antenna means 100 receives the output of the multiplexer 88 and illuminates a reflector 122 forming a high gain beam. The broadband antenna means 100 has a common phase center at the center of the feed aperture for all the spectral components. Thus, a coherent summation in space of all the transmitter signals is synthesized to form a required predetermined train of short pulses indicated by a pulse train 123 shown in FIG. 8.

On receive, the incoming signal is received by the reflector 122 and focused on the broadband antenna means 100 and coupled into the multiplexer 88. The multiplexer 88 separates all the spectral components of the incoming pulse train. Each spectral component is coupled by one of the duplexers 121 through receiver protection means 130, which may be a T-R switch, to the input of an in-phase and quadrature receiver 131. Each spectral component has its own receiver 131 in which it is amplified, detected and converted from an analog to a digital signal. The outputs of all of the receivers 131 are applied to the input of an adaptive processor 132. The output of the adaptive processor is applied to a display 133. It will be understood that the adaptive processor 132 may be replaced with an analog processor using delay lines, if desired.

The adaptive processor 132 is part of a signal processor that includes a waveform synthesizer 140 and a frequency control 141. In FIG. 8, the waveform synthesizer 140 is shown coupled to the adaptive processor 132 and to the frequency control 141. The frequency control 141 is shown coupled to each of the plurality of phase-locked oscillators 82, and to each of the plurality of receivers 131. In operation of the radar of FIG. 8, a required predetermined synthesized train of short pulses is selected on the waveform synthesizer 140, which determines the spectral lines required to produce the required pulse train. The frequency control 141 then pre-sets the phase-locked oscillators 82 to produce the required spectral lines. The frequency control 141 pre-sets the receivers to detect the return signal of the required spectral lines. The radiated spectral components result in synthesis of the predetermined train of short pulses in space. It should be understood that each of the plurality of transmitters can be individually tuned and can be individually turned off. The required number of transmitting sources is a function of the pulse duration and the pulse repetition frequency. The "on" time for each transmitter is made equal to the total length of the synthesized predetermined pulse train corresponding to the required integration time on target. The modulated output of each transmitter has a sin x/x frequency distribution corresponding to one of the spectral lines of the synthesized predetermined pulse train. The system of the present invention is tolerant of large phase errors between components and does not easily lose its coherent pulse characteristics. It is very robust.

Figure 9:
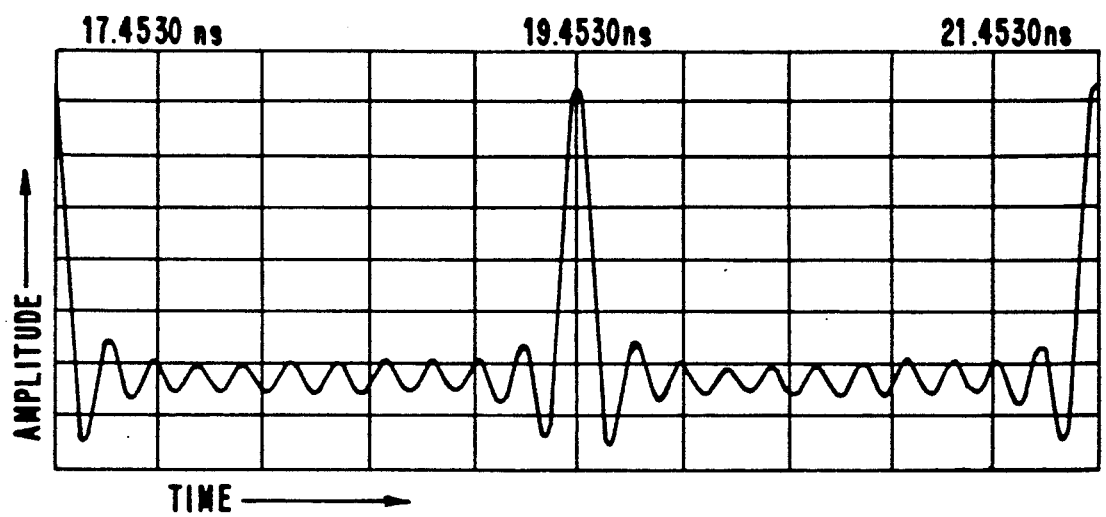
FIG. 9 is a graph of amplitude versus time of the measured impulse waveform synthesized by the impulse radar of FIG. 8.

FIG. 9 is a graph of amplitude versus time of the measured impluse waveform using eleven frequency sources over a 5 GHz bandwidth. FIG. 9 shows a pulse train of three pulses approximately 200 picoseconds in duration separated by two nanoseconds that were formed by combining eleven spectral lines instead of by "on" "off" switching.

Figure 10:
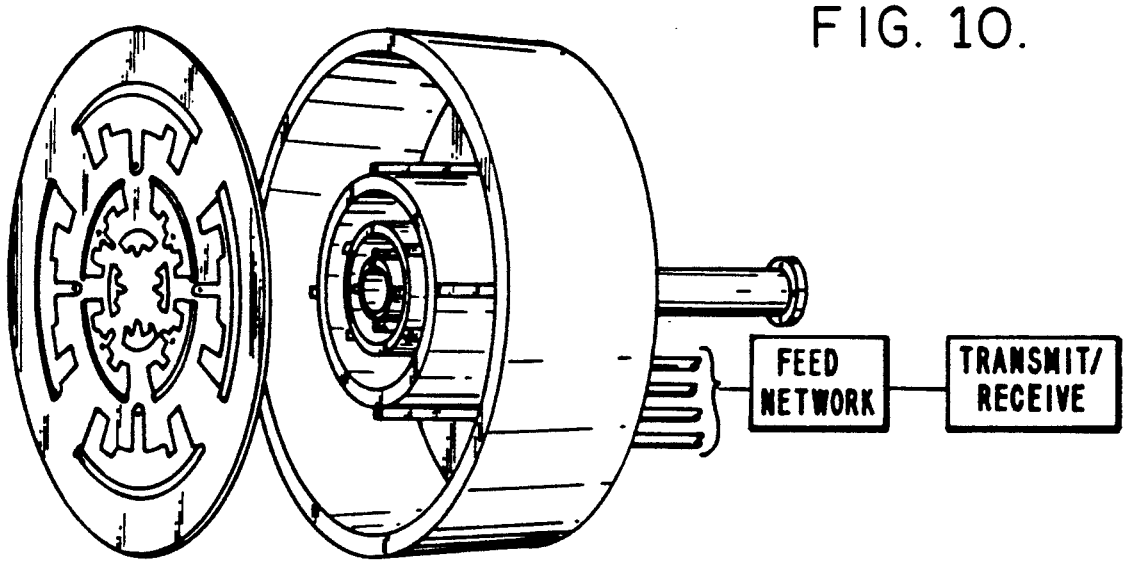
FIG. 10 is a partially exploded pictorial view of a broadband multiplexing feed that may be employed with the impulse radar of the present invention.

FIG. 10 is a partially exploded pictorial view of an embodiment of a broadband multiplexing feed horn that may be employed in the impulse radar of the present invention. The embodiment shown in FIG. 10 is a nested cup dipole feed type of horn that is shown in U.S. Pat. No. 4,042,935, assigned to the assignee of the present invention. The broadband multiplexing feed horn of FIG. 10 has a common phase center at the center of the feed aperture for all the spectral components radiated to a reflector. Each element covers one octave bandwidth, and the concentric structure provides a common phase center. This results in a coherent summation of all the transmitted signals to form the predetermined train of pulses. On receive, the broadband multiplexing feed horn of FIG. 10 separates all the spectral components of the incoming pulse train.

Figure 11:
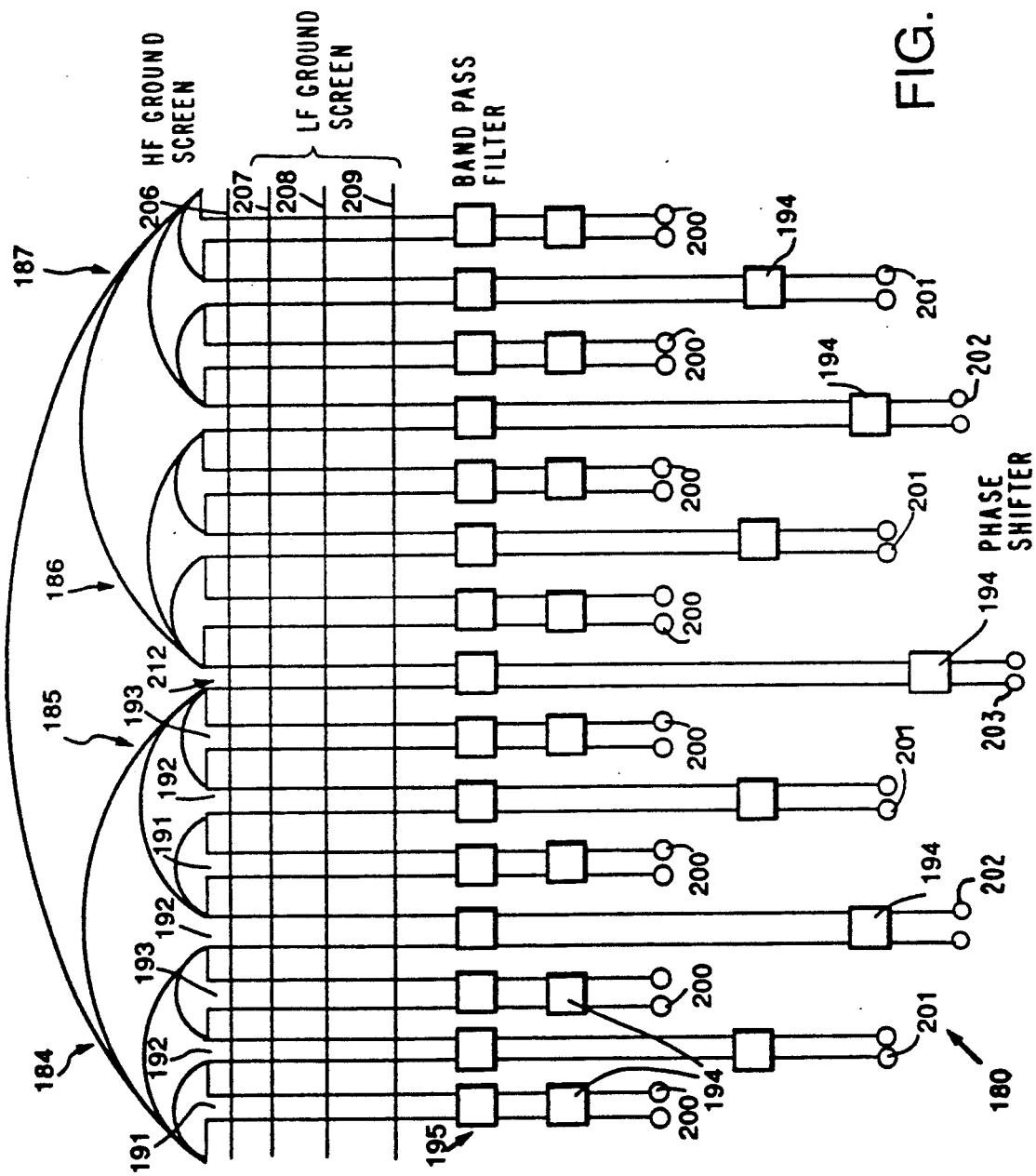
FIG. 11 is a schematic diagram of another type of feed that may be employed with the impulse radar of the present invention.

Other types of broadband multiplexing feed arrangements may be used. One such broadband feed type is the multi-frequency band phased array antenna 180 shown in FIG. 11. This antenna 180 is described in U.S. Pat. No. 5,087,922, and assigned to the assignee of the present invention. This antenna 180 uses coplanar dipole elements 184, 185, 186, 187 with multiple feed ports 191, 192, 193 (left, center and right). The dipole elements 184, 185, 186, 187 and their associated feed networks and phase shifters 194 are printed on the same dielectric board.

Separate feed networks for each band are used. There are eight high-band feeds 200, four high-intermediate band feeds 201, two low-intermediate band feeds 202, and one low-band feed 203. With independent feeds 200-203 the antenna 180 is capable of forming simultaneously and independently steerable beams. Each band has separated feeds 200-203 and phase shifters 194 but shares a common aperture. Each feed 200-203 is provided with its own separate bandpass filter 195 (short or open).

Due to the change in the effective dipole height as a function of frequency, several frequency selective ground planes are used for different operating frequency bands. High frequency ground screens 206 are arranged to be closer to the active radiating elements than the lower frequency ground planes 207, 208, 209 and results in good ground reflection at the resonant frequency. For lower frequency operation, the combined effect of the high frequency screen 206 and the additional low frequency screens or ground planes 207, 208, 209 will give desirable ground reflection for the particular operating frequency.

In operation, the bandpass filters 195 act as either a short circuit or an open circuit. At the low frequency band, all feed ports except a low band feed port 212 are shorted so that the two sections of the dipole elements 184, 185, 186, 187 to the left of the low band feed port 212 form one low band dipole arm and the two sections of the dipole elements 184, 185, 186, 187 to the right of the low band feed port 212 form the other low band dipole arm. Thus, the low frequency dipole is driven by the low band feed port 212.

At the high frequency band, all the feed ports are an open circuit so that the two sections to the left of each of the center ports 192 form one high band dipole, and the two sections to the right thereof form a second high band dipole coplanar with the first. Thus, all of the outer feed ports 191, 192, 193 drive eight high band dipoles comprising the antenna 180 at the high frequency band.

Figure 12:
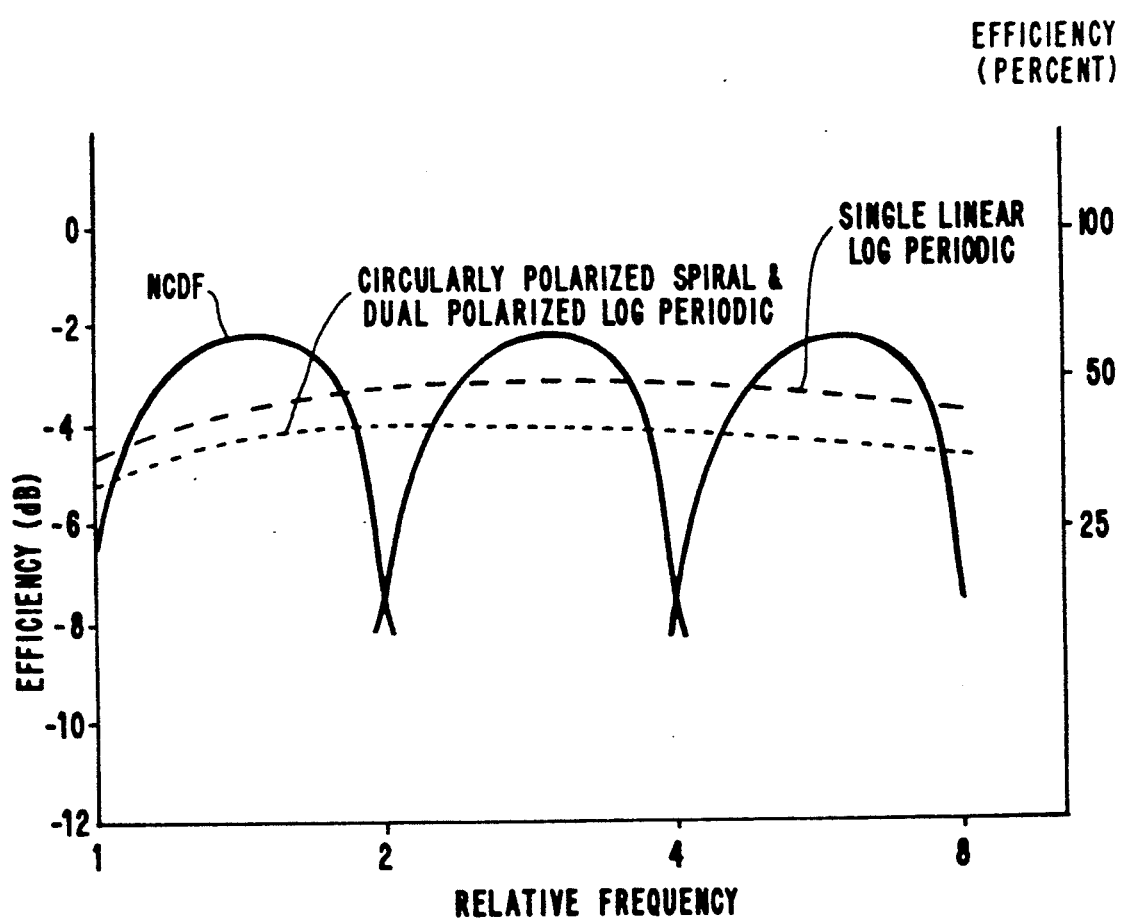
FIG. 12 is a graph of efficiency versus relative frequency for a comparison of different broadband antenna feeds.

FIG. 12 is a graph of measured efficiency versus relative frequency for a comparison of different broadband antenna feed types.

In operation, the improved impulse radar of the present invention is adapted to transmit and receive a train of extremely short pulses (typically 200 picoseconds) with a target detection range of 25 nautical miles or more. The impulses are generated coherently in space by transmitting or receiving all the Fourier spectral components of the short pulses through an antenna that has a common phase center for all the spectral components. The improved impulse radar of the present invention is adapted to detect small radar cross section targets (typically 0.0001 square meters). The radar of the present invention is adapted to separate direct path radar returns from multipath radar returns, thus allowing the detection of low flying sea skimmer missiles. Furthermore, the wide bandwidth signal from the radar of the present invention is adapted to enhance the signal return from a low radar cross-section target because of the resonant scattering characteristics of the target over a wide frequency band. The improved impulse radar of the present invention may have application as an adjunct radar to existing air defense radar installations.

It should be understood that the detection of very small objects such as missiles is merely one of many possible uses for the impulse radar of the present invention. The short pulses produced by the improved impulse radar of the present invention provide very high resolution. At the speed of light, a 200 picosecond pulse is on the order of two inches long. The radar can map a target aircraft, for example, section by section starting at the nose, going back to the wings, and then to the tail. Thus, it provides a form of imaging, whose operation may be termed non-cooperative target recognition. Furthermore, the system of the present invention is not subject to multipath cancellation problems, since the transmission covers a very wide bandwidth, and hence, not all of the signal components fade out at the same time.

The impulse radar of the present invention emits a wideband signal at a low power level. The signal is difficult to detect and intercept. Thus, it provides a low probability of intercept radar. This may be appreciated by referring to FIG. 4. A multiplicity of receivers 50 are used to detect the multiplicity of transmitted frequencies. the output signals from each receiver are coherently combined by the processor 51. Since the arriving waves are coherent across the channels while the noise is not, a strong detected signal results. In each receiver channel, the operational signal-to-noise ratio may be substantially below the detection threshold for a single receiver. In effect, this array of coherently combined receivers constitutes a matched filter for the transmitted waveform. Efficient detection of the waveform requires an a priori knowledge of the transmitter architecture. Various waveform parameters, such as frequencies and phases, may be rapidly changed to make unintended detection difficult.

With reference to FIG. 8, the present invention may be used for communications as a microwave link, and it will be understood that the oscillator 80 may be frequency modulated by a microwave link modulator 145, and a microwave link demodulator 146 to demodulate received signals to provide communications. The modulation and demodulation is provided for in a conventional manner. It may also be used as a covert IFF system to identify friendly aircraft, by using an IFF code 147 which is transmitted by way of the radar system and a corresponding IFF response decoder 148 that is processes by the processor 132. The radar of the present invention provides signals that penetrate sand and may be used for mapping and to locate land mines buried in the sand. It may also be used for clearing away land mines by detonating them. This is accomplished by adjusting the gain controls 86 in the radar of FIG. 8 to a relatively high level, sufficient to explode the mines. When the power is turned up, the radar provides for a directed energy beam. The radar of the present invention may be adapted to perform adaptive jamming, and it can be caused to sweep or scan. In FIG. 8, an adaptive scanning control means 149 under control of the processor 132 selectively controls the frequency output of the oscillator to cause the sweeping and scanning of the output of the radar, and hence provides for adaptive jamming. The radar of the present invention is also a jam resistant radar, and it is hard to jam because the receiver array is insensitive to noise at frequencies outside the narrow bandwidths of the individual receivers and also to noise which is not coherent across the multiplicity of receiver channels.

Thus there has been described several embodiments of a new and improved impulse radar. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus comprising:
    a plurality of transmitters, each of said transmitters adapted to provide one spectral component of a predetermined pulse train;
    a plurality of duplexers each individually coupled to the output of a different one of said plurality of transmitters;
    a broadband multiplexing feed coupled to each of said plurality of duplexers and having an aperture;
    a reflector having a focal point disposed at the aperture of said multiplexing feed;
    a plurality of narrow band receivers, each of said receivers adapted to amplify and detect one spectral component of said predetermined pulse train;
    a signal processor coupled to the outputs of said plurality of receivers and adapted to coherently combine the amplified and detected spectral components of said predetermined pulse train to produce an output radar signal; and
    a display coupled to said signal processor for displaying said radar signal.

2. The apparatus of claim 1 wherein said plurality of transmitters comprises a master oscillator coupled to a comb generator for generating a plurality of spectral components, which spectral components are applied to the plurality of duplexers.

3. The apparatus of claim 1 wherein said broadband multiplexing feed comprises a nested cup dipole feed.

4. The apparatus of claim 1 wherein said broadband multiplexing feed comprises a multi-frequency band phased array antenna.

5. A microwave link comprising:
    a transceiver comprising:
    a master oscillator;
    a plurality of transmitters coupled to the master oscillator, each of said transmitters adapted to provide one spectral component of a predetermined microwave pulse train;
    modulator means for frequency modulating oscillator signals provided by the master oscillator;
    a plurality of duplexers each individually coupled to the output of a different one of said plurality of transmitters;
    a broadband multiplexing feed coupled to each of said plurality of duplexers and having an aperture;
    a reflector having a focal point disposed at the aperture of said multiplexing feed;
    a plurality of narrow band receivers, each of said receivers adapted to amplify and detect one spectral component of said predetermined microwave pulse train;
    a signal processor coupled to the outputs of said plurality of receivers and adapted to combine the amplified and detected spectral components of said predetermined microwave pulse to produce an output signal; and
    demodulator means coupled to the signal processor for demodulating the output signal.

6. A method of providing a synthesized ultra wideband waveform comprising the steps of:
    generating a signal having a single frequency;
    simultaneously generating a plurality of harmonics of the single frequency;
    based upon a desired synthesized output pulse train, selecting predetermined ones of the plurality of harmonics;
    simultaneously transmitting the plurality of harmonics by means of a radiating source having a common phase center to provide a phase coherent synthesized ultra wideband waveform.

7. The method of claim 6 further comprising the step of:
    scanning the phase coherent synthesized ultra wideband waveform across a target;
    receiving the returned signals from the target to map the target, thereby providing an image of the target.

8. The method of claim 6 further comprising the step of:
    rapidly changing selected ones of the frequencies and phases of the signal to provide a synthesized waveform having a low probability of detection.

9. The method of claim 6 which further provides for a directed energy beam, said method comprising the steps of:
    amplifying the predetermined ones of the plurality of harmonics of the single frequency to a predetermined relatively high energy level; and
    simultaneously transmitting the plurality of harmonics having a predetermined relatively high energy level by means of a radiating source having a common phase center to provide a phase coherent synthesized waveform having relatively high power that comprises a directed energy beam.

* * * * *